C. NEWMAN.
LAMP.
No. 7,030. Reissued April 4, 1876.
Fig. 1.
Fig. 2.
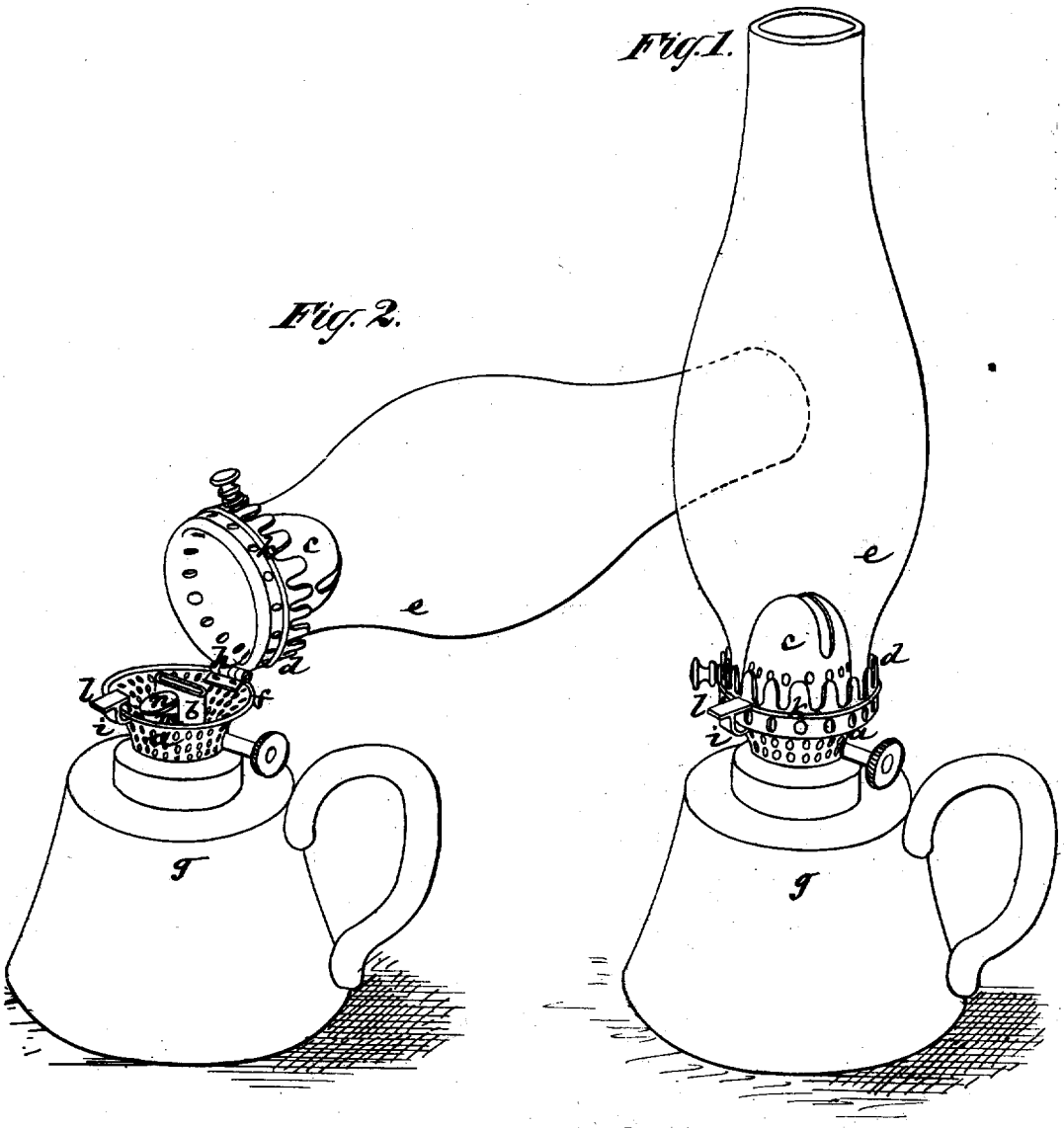
Fig. 3.
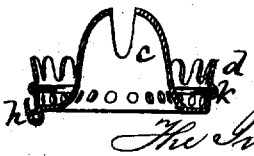
Witnesses
John Becker.
Fred Haynes
Inventor.
Carlton Newman,
The Ivy Patent Lamp Company
by its Attorneys
Brown & Allen
N. PETERS, PHOTO-LITHOGRAPHER, WASHINGTON, D. C.

UNITED STATES PATENT OFFICE.

CARLTON NEWMAN, OF PITTSBURG, PA., ASSIGNOR, BY MESNE ASSIGNMENTS, TO THE IVES PATENT LAMP COMPANY, OF NEW YORK CITY.

IMPROVEMENT IN LAMPS.

Specification forming part of Letters Patent No. 33,047, dated August 13, 1861; reissue No. 7,030, dated April 4, 1876; application filed March 16, 1876.

DIVISION B.

*To all whom it may concern:*

Be it known that CARLTON NEWMAN, of Pittsburg, in the county of Allegheny and State of Pennsylvania, invented an Improvement in Lamps, of which the following is a full, clear, and exact description, for which Letters Patent were issued to said NEWMAN, August 13, 1861, and the exclusive right to which Letters Patent is now vested, by assignment, in the IVES PATENT LAMP COMPANY, of New York, reference, in explanation of the invention, being had to the accompanying drawing, which forms part of this specification.

This invention pertains to oil or fluid lamps in which a cone or cap is placed over the wick-tube, and a chimney so arranged as to cause a free supply of air below the cone or cap.

The object of the invention is to provide a convenient means for filling or replenishing the lamp with oil or burning-fluid without unscrewing the burner-frame from its socket, and without detaching the cone or cap. To this end the invention consists in a lamp-burner having an oil-supply or feed tube within the circumference of the burner-frame, in combination with a hinged cone or cap, under which said supply or feed tube is arranged, preferably in front of that side of the wick-tube which is farthest removed from the hinge of the cone, to facilitate filling when opening or throwing back the cone.

In the drawing, Figure 1 is a view in perspective of a lamp for burning coal and other oil, having the invention applied. Fig. 2 is a similar view with the hinged cone or cap turned up or back, so as to expose the wick-tube and the oil-supply or feed tube, for the purpose of lighting the lamp, trimming the wick, or replenishing the oil. Fig. 3 is a vertical section of the hinged cone, which is here shown as provided with a crown-piece, or as being in one piece with what may be termed the "crown" of the burner.

The burner which has been selected to illustrate the invention comprises a perforated burner-frame, *a*, a flat wick tube or holder, *b*, and a cone or cap, *c*, having the crown-piece *d* of the burner-frame attached to it, instead of being made of one piece with the perforated burner-frame; but this is no part of the invention, although it forms a convenient means for hinging the cone to the burner-frame—a hinged cone being one of the elements of the combination of which this invention is composed. These several parts may be of any ordinary construction, as may also the glass chimney *e*. The top of the perforated burner-frame *a*, where it comes in contact with the base of the crown-piece *d* of the cone *c*, is furnished with a head or flange, *f*, so as to give a bearing for the crown-piece. Said cone *c* is hinged to the burner-frame *a* by a hinge, *h*, applied to the cone or attached crown-piece, and so constructed as to allow of the cone to be turned back or over to one side far enough to be out of the way in trimming the lamp. On the opposite side of the burner-frame *a* to that on which the hinge *h* is arranged is a spring-catch, *i*, which, when the cone is shut down, passes over the bead *k* on the rim of the crown-piece, and thus securely holds the cone in place, a thumb-piece, *l*, on the spring serving to depress the spring and leave the cone free to be turned over when desired.

Within the circumference of the burner-frame *a* is formed or introduced an oil-supply or feed tube, *m*, which opens into the oil receptacle or chamber *g* of the lamp, and is furnished with a cap or cover, which may be a plug or screw, *n*. Said oil-supply or feeding tube is placed to one side of the wick-tube *b*, and on that side which is farthest from the hinge *h*, so as to be more conveniently reached (on throwing the cone back or over) by the mouth of the oil-can. Through this supply or feed tube *m* the lamp may be replenished with oil at pleasure, and as said tube is arranged under the cone or cap *c* it is covered and concealed by the cone, but may be exposed without detaching the cone by simply turning the latter back on its hinge *h*, in the manner hereinbefore described, and without unscrewing the burner-frame from its socket or the lamp.

It may here be observed that oil-supply or feed tubes fitted with caps or screw-plugs have been used in oil-lamps before; but this improvement has said tube inside of the burner-frame under an attached and hinged cone, so that the latter does not require to be removed, and the oil-supply or feed tube is concealed and protected when the cone is shut down.

What is claimed is—

1. The combination, in a lamp-burner, of a hinged cone or cap and a feed or supply tube placed within the circumference or outer margin of the burner-frame, and under said hinged cone or cap, whereby the lamp may be replenished with oil or fluid without unscrewing the burner-frame from its socket, and without detaching the cone, substantially as specified.

2. The arrangement of the supply or feed tube *m*, which is under the hinged cone or cap *c*, on that side of the wick-tube *b* which is farthest from the hinge *h*, by which the cone is attached to the frame, essentially as and for the purposes herein set forth.

HORACE CRAIGHEAD,
*Treasurer of the Ives Patent Lamp Co.*

RIVERIUS MARSH,
*Secretary of the Ives Patent Lamp Co.*

Witnesses:
FRED. HAYNES,
BENJAMIN W. HOFFMAN.